Figure 1:
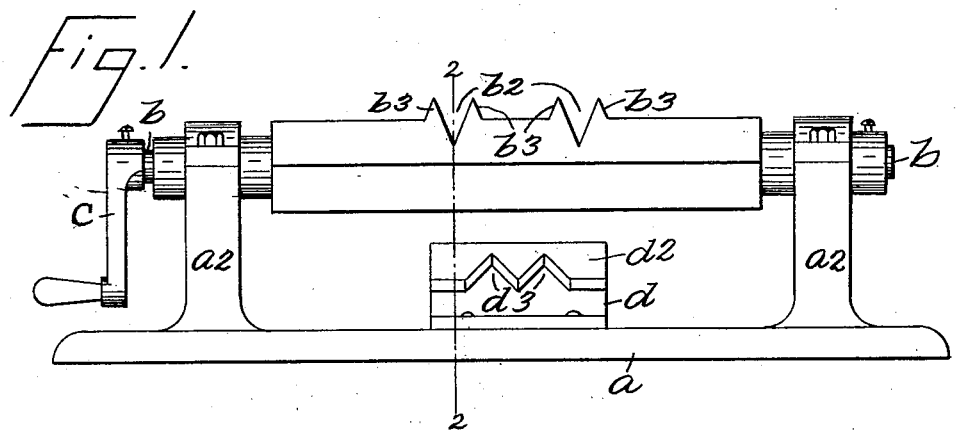

No. 732,300. PATENTED JUNE 30, 1903.
H. H. HOLLENDER.
SINEW EXTRACTOR.
APPLICATION FILED SEPT. 17, 1902.

NO MODEL.

WITNESSES
J. C. Larsen
F. A. Stewart

INVENTOR
Hugo H. Hollender
BY Edgar Tate & Co
ATTORNEYS

No. 732,300. Patented June 30, 1903.

UNITED STATES PATENT OFFICE.

HUGO H. HOLLENDER, OF NEW YORK, N. Y.

SINEW-EXTRACTOR.

SPECIFICATION forming part of Letters Patent No. 732,300, dated June 30, 1903.

Application filed September 17, 1902. Serial No. 123,753. (No model.)

*To all whom it may concern:*

Be it known that I, HUGO H. HOLLENDER, a citizen of the United States, residing at New York, in the county of New York and State of New York, have invented certain new and useful Improvements in Sinew-Extractors, of which the following is a full and complete specification, such as will enable those skilled in the art to which it appertains to make and use the same.

The object of this invention is to provide an improved device for extracting the sinews, tendons, and the like from the legs of turkeys and other food-fowls; and with this and other objects in view the invention consists in a device of the class specified constructed as hereinafter described and claimed.

The invention is fully disclosed in the following specification, of which the accompanying drawings form a part, in which the separate parts of my improvement are designated by suitable reference characters in each of the views, and in which—

Figure 2:
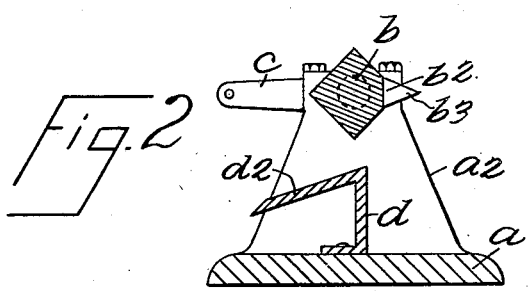
Figure 3:
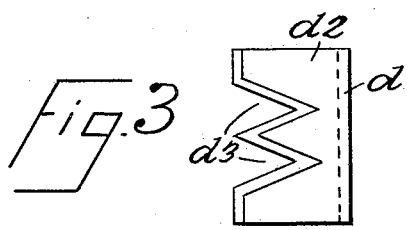

Figure 1 is a side view of a device embodying my invention; Fig. 2, a transverse vertical section thereof, and Fig. 3 a plan view of a detail of the construction.

In the practice of my invention, as shown in the drawings, I provide a base $a$, which is adapted to be secured to a table or other support. Said base is provided with two upright members $a^2$, in the tops of which is mounted a shaft $b$, the central portion of which is preferably angular in cross-section, and arranged centrally of this shaft and at one of the corners thereof are V-shaped clutches $b^2$, which, as shown in the drawings, are formed partially in the body portion of the shaft and partially by projecting teeth $b^3$. The shaft $b$ is also provided at one end with a crank $c$ or with any suitable device for turning said shaft.

Arranged centrally of the base $a$ and beneath the central or body portion of the shaft $b$ is an upright member $d$, having a top plate $d^2$, which projects from one side thereof laterally and preferably in a downwardly and backwardly directed position, and the plate $d^2$ is provided with two clutches comprising V-shaped or triangular notches or recesses $d^3$; and in practice the fowl is placed on the table or other support in front of the edge of the machine, the legs of the fowl are passed through the V-shaped recesses $d^3$ and the ankles of said legs are passed into the clutches $b^2$ or into the V-shaped recesses forming said clutches and held therein, and the shaft $b$ is then turned to the right. This operation breaks the legs between the knee and ankle joints and a further turning of the shaft pulls out the sinews, as will be readily understood.

My invention is not limited to the form of the clutch-plate $d^2$ nor the method of connecting same with the base $a$, all that is necessary being to provide a device beneath the central portion of the shaft $b$, against which the fowl may be placed and through which the legs of the fowl may be passed. The form of the shaft $b$ or the central portion thereof is also immaterial, all that is necessary being to provide a shaft with suitable clutches between which the ankles of the legs of the fowl may be passed, so that when the shaft is turned the feet will hold the legs in connection with the shaft and the turning of the shaft will break the legs and pull out the sinews, as hereinbefore described. It will be observed that in Fig. 2 of the drawings the shaft is turned to a position at right angles to that of Fig. 1, and in this position the clutches on the shaft project backwardly, and this is the position occupied by the shaft when the legs of the fowl are connected therewith, as herein described.

Other changes in and modifications of the construction described may be made without departing from the spirit of my invention or sacrificing its advantages, and I reserve the right to make all such alterations as fairly come within the scope of the invention.

Having fully described my invention, what I claim as new, and desire to secure by Letters Patent, is—

1. A device of the class described comprising a base, a shaft supported thereover and provided centrally with clutches adapted to receive and hold the legs of a fowl, said base being also provided beneath said shaft with other clutch devices through which the legs of the fowl are passed, substantially as shown and described.

2. A device of the class described comprising a base having upright members, a shaft mounted in said members provided with clutch devices, and an upright member connected with the base beneath the shaft and means for turning said shaft, substantially as shown and described.

In testimony that I claim the foregoing as my invention I have signed my name, in presence of the subscribing witnesses, this 16th day of September, 1902.

HUGO H. HOLLENDER.

Witnesses:
WM. R. MOORE,
JAS. A. DOWD.